US009571481B1

(12) United States Patent
Baer et al.

(10) Patent No.: US 9,571,481 B1
(45) Date of Patent: Feb. 14, 2017

(54) ONCE ONLY DISTRIBUTION OF SECRETS

(75) Inventors: Graeme D. Baer, Seattle, WA (US); Gregory B. Roth, Seattle, WA (US); Nathan R. Fitch, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 185 days.

(21) Appl. No.: 13/308,424

(22) Filed: Nov. 30, 2011

(51) Int. Cl.
*G06F 21/31* (2013.01)
*H04L 29/06* (2006.01)
*G06F 21/33* (2013.01)

(52) U.S. Cl.
CPC .......... *H04L 63/0807* (2013.01); *G06F 21/33* (2013.01); *H04L 63/0823* (2013.01); *H04L 63/0838* (2013.01)

(58) Field of Classification Search
CPC .... H04L 63/08; H04L 63/083; H04L 63/0838; H04L 63/0846; H04L 9/08; H04L 9/0861; H04L 9/0863; H04L 63/0807; H04L 63/0823; G06F 21/31; G06F 21/33
USPC ........ 726/1–10; 713/150, 168–173, 182–185
See application file for complete search history.

(56) References Cited

U.S. PATENT DOCUMENTS

| | | | | |
|---|---|---|---|---|
| 7,391,784 B1 * | 6/2008 | Renkel | ................... | H04L 12/66 370/352 |
| 8,358,765 B1 * | 1/2013 | Whitten | .................. | H04M 3/02 379/211.02 |
| 2002/0095507 A1 * | 7/2002 | Jerdonek | ............... | H04L 9/3271 709/229 |
| 2003/0061520 A1 * | 3/2003 | Zellers et al. | ................. | 713/202 |
| 2004/0158715 A1 * | 8/2004 | Peyravian | ............. | H04L 9/3013 713/171 |
| 2005/0177750 A1 * | 8/2005 | Gasparini et al. | ............ | 713/201 |
| 2006/0041759 A1 * | 2/2006 | Kaliski, Jr. | ............. | G06F 21/31 713/184 |
| 2006/0085845 A1 * | 4/2006 | Davis et al. | ....................... | 726/6 |
| 2006/0155985 A1 * | 7/2006 | Canard | ................... | G06F 21/33 713/156 |
| 2008/0046988 A1 * | 2/2008 | Baharis et al. | .................... | 726/7 |
| 2010/0263029 A1 * | 10/2010 | Tohmo et al. | .................... | 726/6 |
| 2012/0331536 A1 * | 12/2012 | Chabbewal | ............. | G06F 21/33 726/7 |

* cited by examiner

*Primary Examiner* — Tae Kim
(74) *Attorney, Agent, or Firm* — Kilpatrick Townsend & Stockton LLP

(57) ABSTRACT

A secret distribution system may disclose a secret once to a client computing resource while maintaining the privacy of the message and allowing for recovery from dropped network messages. A claim code may be given to a client which may be sent to the secret distribution system, causing the secret distribution system to send a pending secret to the client. Until a client successfully confirms receipt of the pending secret or the claim code expires, the client may request new pending secrets to replace the prior unconfirmed secrets from the secret distribution system. Once a last-sent pending secret is confirmed by the client to the secret distribution system, the last-sent pending secret may be activated for use and the claim code invalidated.

24 Claims, 7 Drawing Sheets

ONCE ONLY DISTRIBUTION OF SECRETS

BACKGROUND

Secrets are often used to provide and confirm the authenticity, privacy and integrity of secured messages. As an example, a secret token may be shared between an application and a server to authenticate the application. In encryption, a secret key may be used to change cleattext to ciphertext as a way to maintain privacy of the cleartext. A Hash-based Message Authentication Code may be used to verify the integrity of a message. However, each of these advantages depends on a secret remaining undisclosed to unauthorized parties.

A secret may be shared with a client who is able to enter that secret into an appropriate device. In some cases, the client may type the secret into an interface on the device. In other cases, the client may copy and paste a block of text to enter the secret. In yet other cases, the client may take a picture of a screen to obtain the secret, such as through optical character recognition or optical code. Unfortunately, if the secret is available to the client, the secret may be viewable by other people as well. While various techniques have been employed to effectively share a secret with only intended parties, due to the complexity of the tasks, the employed techniques are of varied success.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include distributing a secret once from a source, such as a secret generating system, to an intended recipient, such as a client computing, resource. The distribution can be performed in a way that maintains a level of privacy with respect to the message and/or allows for recovery from dropped network messages. In one embodiment, a client is given a claim code, secret creation message or other mechanism that may be used to request a pending secret, such as by a client entering the code into a client device, instead of sharing the secret directly with the client. The pending secret may be transmitted once from the secret generating system to the client device having the claim code. The client device can also confirm receipt of the pending secret. Should the confirmation fail, such as because of a dropped message, the client device may use the claim code to request a new pending secret and try to confirm again. As, the pending secret is only shared once through a transmission to the client device or other such computing resource, the pending secret may be more difficult to duplicate than ones sent and/or stored via other methods, such as email or text message. The claim code, however, may be sent via the insecure communication channels and may be invalidated after the client device confirms receipt of the pending secret and activates the pending secret for use. The short lifespan of the claim code and its single purpose use may make it significantly less valuable than the pending secret itself. As the transmission of the secret is not stored in an open format, such as email or text message, the risk of multiple clients having the secret is reduced.

Figure 1:
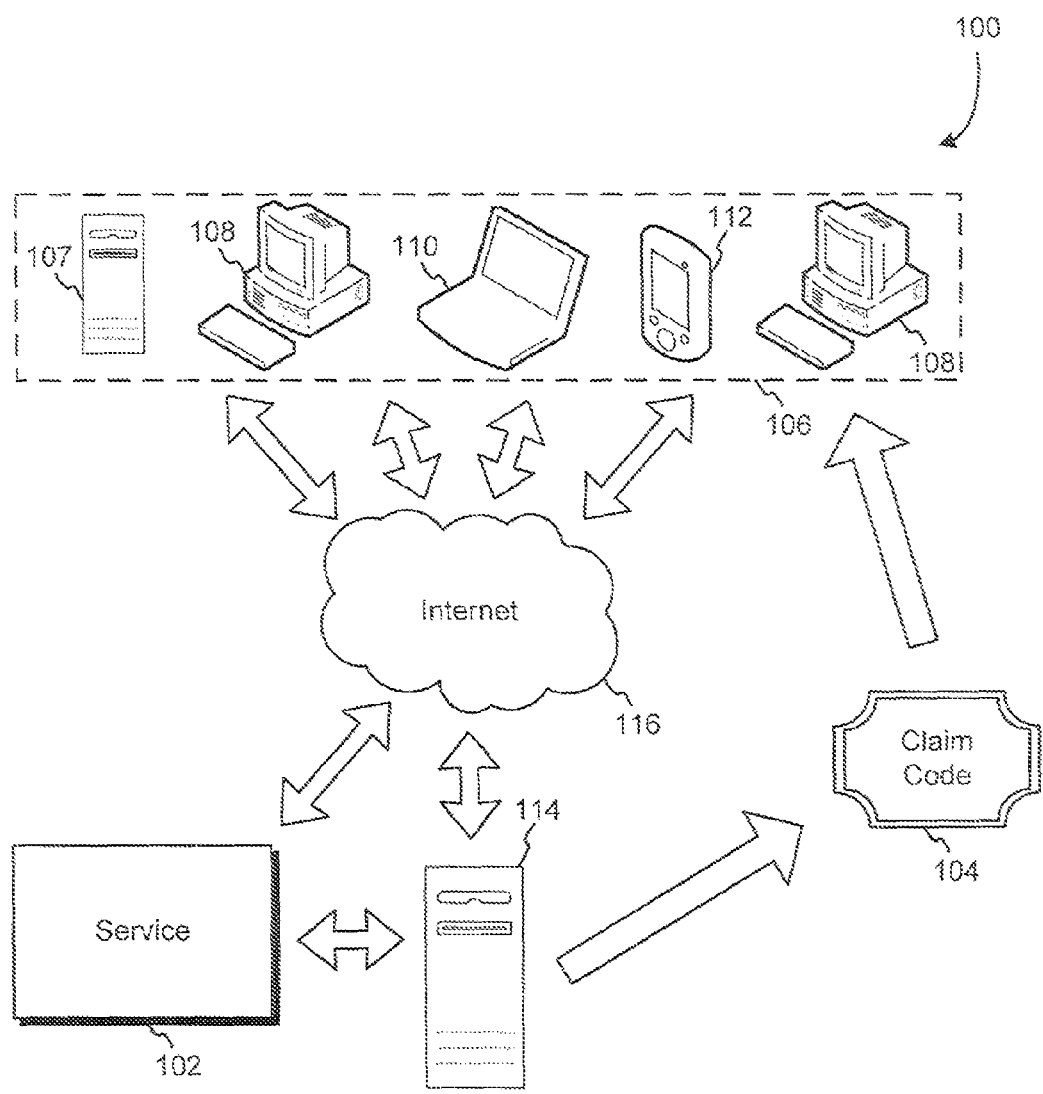
FIG. 1 shows an illustrative example of an environment in which a secret may be distributed in accordance with at least one embodiment.

For example, a client may wish to have access to a service 102 in an environment 100 similar to FIG. 1. A client may be a user, a system or other entity requesting a secret. An administrator or other trusted entity may issue a claim code 104 authorizing its bearer to receive a secret. A client may receive the claim code 104 through a first channel of communication, such as text messaging. The claim code may be entered into a device 106 under the control of the client, such as a server 107, desktop 108, laptop 110 or mobile device 112. The device may receive the claim code 104 into an application, program, web page or other interactive system on the device 106. The device 106 may then send the claim code 104 to a secret distribution system 114 through a second channel of communication, such as a network or internet 116. The secret distribution system 114 may send a secret to the device 106. After confirming the receipt of the secret by the device 106, the secret distribution system 114 may activate the secret for use. In this example, the secret distribution system 114 may activate secret for acceptance by the service 102.

In one embodiment, client device may construct a message to a secret distribution system over a secure channel to request a secret and include the claim code. The system may respond with a newly-generated secret. If the client device does not receive the response, the client device and system may repeat this step multiple times, though optionally subject to policy-based restrictions (which may include a short time window after the first request, or restricting repeat requests to only be from the same client IP address). Each repeated request may cause the system to invalidate the previously generated secret and return a new secret.

Once the client device successfully receives a response, the client device may construct a message to the secret distribution system proving possession of the secret (which may include providing the secret itself, a hash of the secret, or by using another cryptographic key derived from the secret). If the client device successfully proves possession of the secret issued by the system in the last issuance request, the system may acknowledge the proof in a return message, invalidate the claim code (if not already implicitly done earlier) and activate the secret for use.

Figure 2:
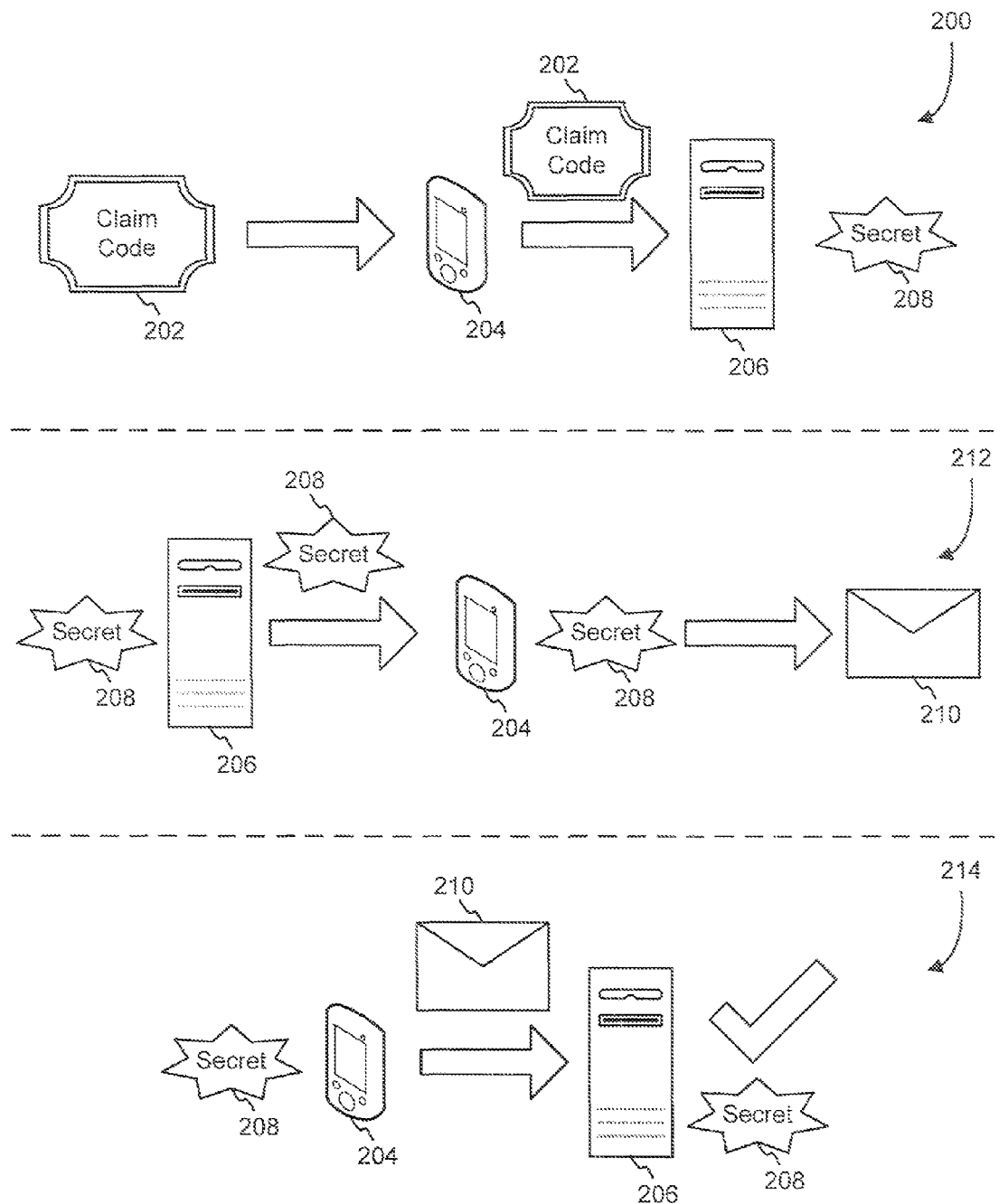
FIG. 2 shows an illustrative example of distributing a secret in accordance with at least one embodiment.

The message flow between secret distribution system and client may be further seen in FIG. 2. The secret distribution system may ensure that a secret is communicated only once to a client during the distribution processes 200, 2.12 and 214. In one embodiment, the secret distribution system may be a server 206 in a datacenter and the client may be an application on a mobile device 204 such as a smartphone. The communications between the secret distribution system and the client may optionally take place over a secure connection, such as an encrypted connection. In a first distribution process 200 outlined in FIG. 2, a client may cause a claim code 202 to be sent to a server 206. A client may receive a claim code 202. The claim code 202 may be given to the client from any number of different sources, including email, text messaging, postal mail, a handout or other communication. The claim code 202 may be entered into a mobile device 204. The mobile device 204 may then communicate the claim code 202 to the server 206. Upon receiving the claim code, or before, the server 206 may construct a secret 208.

In a second distribution process 212 outlined in FIG. 2, the server 206 may share the secret once with the mobile device 204. After constructing the secret 208, the server 206 may send the secret to the mobile device 204. In many embodiments, it may be desirable to send the secret 208 and/or claim code 202 over a secure connection, such as SSL, TLS or an encrypted connection. The mobile device 204 may store the secret 208 and construct a message 210 based upon the secret. In some embodiments, this message may include a Hash-based Message Authentication Code (HMAC) using the secret. In other embodiments, the secret may be placed in the message itself and encrypted.

In a third distribution process 214, the mobile device 204 may confirm receipt of the secret to the server 206 and activate the secret 208 for use. After creating the message 210 based upon the secret 208, the mobile device may send the message to the server 206. As the message 210 is based at least in part on the secret 208, the server 206 may confirm that the mobile device 204 has received the secret 208. The server 206 may then invalidate the claim code 202 and store the secret 208. Both the mobile device 208 and server 206 may enable the secret for use in other applications.

In some embodiments, activation of a secret and expiration of a claim code may happen at various times. In one embodiment, the claim code may remain active for a determined period after the associated secret has been confirmed. Further use of the claim code may cause the confirmed secret be replaced with a new secret. In another embodiment, the secret may be activated for use upon sending of the secret. Confirmation of the secret may just serve to trigger the expiration timing of the claim code. In another embodiment, the secret may not become active until confirmed. Confirming receipt of the secret may cause the claim code to expire or trigger an expiration time of the claim code to begin. Thus a claim code may expire based at least in part on an expiration length and an event, including receipt of the claim code, sending of the secret, activation of the secret and creation of the claim code.

The secret 208 may be used in multiple applications. The secret 208 may be used in dual authentication, such as a multi-factor authentication to email or a corporate network. For example, the secret may be a seed used in a smartphone application proving possession of the phone. In another embodiment, the secret 208 may be used for three legged authorizations, such as a three legged OAuth transaction. In one embodiment, the claim code 202 may be passed from a client to a third-party application which may use the claim code 202 to receive a token from a second system associated with the client. The third party application may use the token to gain access to the client's data or services. For example, a client may wish to grant permission for a third party data mining service to access the client's email. The client may request a claim code 202 from the email service. The client may input the claim code 202 into the third party data mining service. The third party data mining service may send the claim code 202 to an email administration system responsible for the client's email. The email administration system may then send a token to the data mining service over TLS/SSL. The data mining service may confirm receipt of the token over the same secure connection. The token may then be activated and used to access the client's email. In some embodiments, this may include the secret distribution system sharing the token with authorization systems.

The claim code 202 may provide several advantages. The claim code 202 may provide an advantage of short term, easily entered code. As a claim code 202 may have a shorter lifespan than the secret 208 it protects, the claim code 202 may be short and selected such that it may be easily typed in a mobile device 204. In some embodiments, the claim code 202 may be eventually recycled. The claim code 202 may also provide an advantage of a public short term code that shields the private code from observers. In some embodiments, the claim code 202 is disclosed in a way that it may be shared and stored for use by a client. The secret 208, however, may be disclosed as part of a transaction between computing systems. As the communication of the secret 208 may be in a more direct manner, such as an encrypted message over the Internet, the risk of more than one recipient is decreased. The claim code 202, however, may be more publicly disclosed, such as by an email. Risk of secret disclosure may be even further reduced by only sending the secret 208 over a secure connection, such as TLS/SSL. As the secret 208 is transmitted using the methods described in FIG. 2 and as described herein, a client and server administrator may reduce the risk that the secret 208 is known outside the server 206 and mobile device 204.

In some embodiments, the claim code 202 is used to identify a client. For example, a claim code 202 may be created by the secret distribution system and sent via email to the client. As the client's identity is associated with the medium through which it is sent, the secret distribution system may generally assume the client receives the claim code 202. This receipt may be further confirmed by other factors, if desired. By associating the identity to the claim code 202, the identity may also be associated with the secret distributed to the client. As the secret 208 is distributed once through a direct interaction, the secret distribution system may be reasonable assured that no other client has access to the secret 208. Another client would have access to the claim code 202, which is invalidated after possession of the secret 208 is confirmed by the client. By the end of the process, the secret may be linked to the identity of the client and become a credential.

Figure 3:
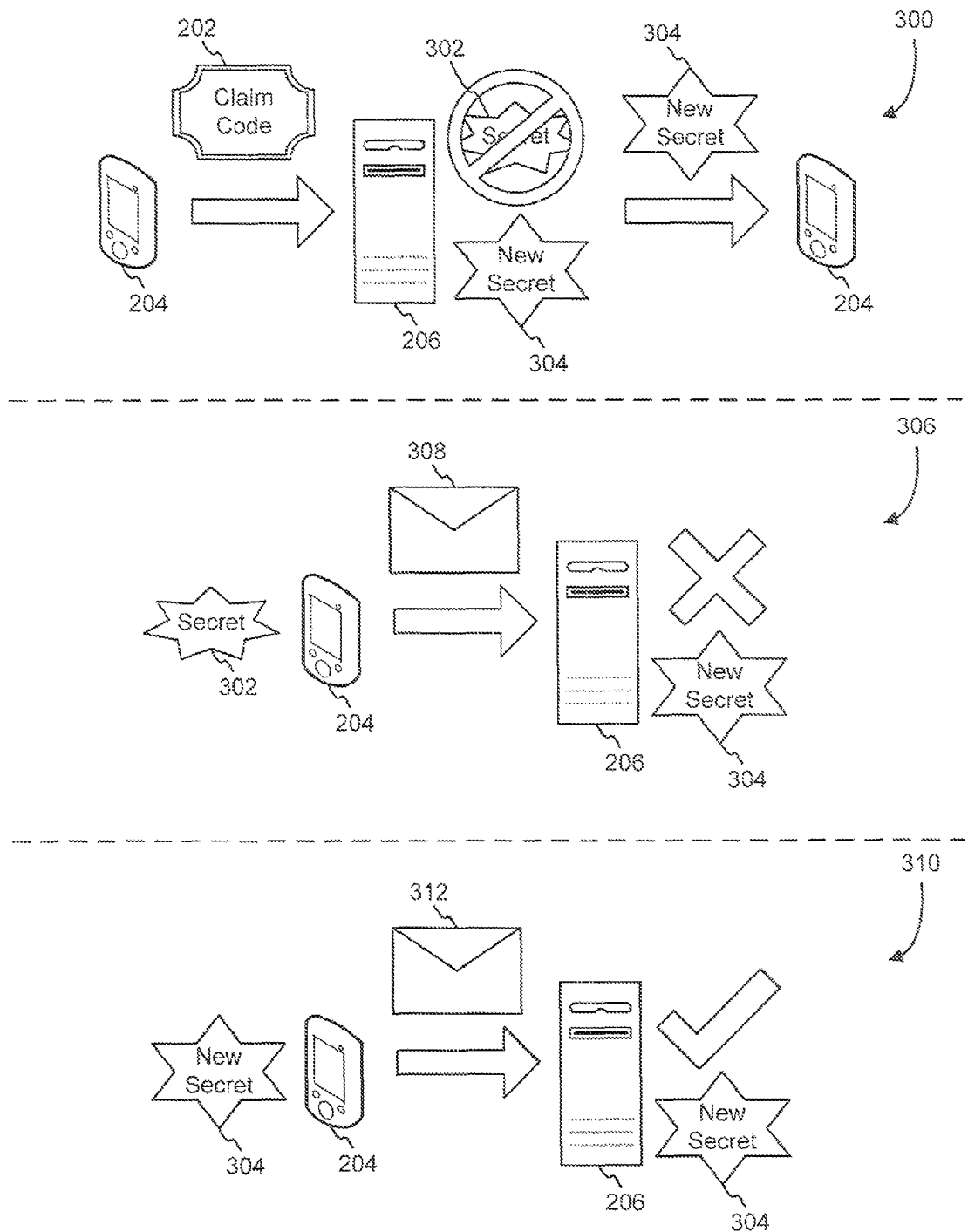
FIG. 3 shows an illustrative example of error message flow in distributing a secret in accordance with at least one embodiment.

During some processes of distributing the secret, errors may occur. In some embodiments, errors may be corrected as seen in FIG. 3. For example in distribution process 300, a claim code 202 may be received a second time by a server 206 from a mobile device 204. The previously generated secret or old secret 302 may be invalidated and a new secret created 304. The new secret 304 may be sent back to the mobile device 204. This error condition may arise when a mobile device 204 did not receive the old secret 302, but the claim code 202 was not yet invalidated. This may occur because of corruption of the message, or even a previous request by a different device that was unsuccessful. This error handling of invalidating an old secret 302 and sending a new secret 304 prevents transmission of the old secret more than once. This process of only sending a secret once may help ensure that only one device receives an activated secret, as the secret is disclosed once and further disclosures are of new secrets.

Should a mobile device 204 attempt to confirm receipt of an old secret 302 after a new secret 304 has been created and disclosed, the confirmation will fail as seen in distribution process 306. Having received an old secret 302, but not a new secret 304, a mobile device 204 may attempt to confirm receipt of the old secret 302. The mobile device 204 may create a confirmation message 308 based on the old secret 302 and send it to the server 206. As the server 206 has already received a claim code 202 at least a second time and invalidated the old secret 302, the server 206 may reject the confirmation message 308. Depending on the embodiment, recovery from the rejection may or may not be possible. If recovery is possible, the mobile device 204 may resend the claim code 202 to the server as seen in distribution process 300 and confirm the new secret as seen in distribution process 310. In other embodiments, if an old secret 302 is received and a claim code 202 has been received a second time to create a new secret 304, it may be probable that there are two devices vying to confirm a secret. Thus it may be advisable to invalidate a claim code 202 and force the owners of both devices to seek a new claim code 302. A rejection may also occur if a malformed secret is used to create a confirmation message, the malformed secret different than the new secret.

However, a new secret 304 may be confirmed and the distribution of a secret accomplished, even if a failure has occurred, as seen in distribution process 310. After receiving a new secret 304, the mobile device 204 may create a confirmation message 312 based on the new secret 304. The confirmation message 312 may be sent to the server 206 where the confirmation message 312 is checked against the new secret 304. As the confirmation message 312 confirms receipt of the new secret 304 by the mobile device 204, the new secret 304 may be activated for use in other applications.

Policies may also be used to enforce limits on the use of claim codes and secret activation. An issue expiration policy may state the amount time between issuance to expiration of the claim code. A use expiration policy may suite the amount of time available between the first use of the claim code and expiration of the claim code. In one embodiment, a claim code may use both expiration times. For example, a claim code may have an issue expiration of a half hour, which would require the claim code to be used within a half hour of being issued. However, once the claim code has been sent to the secret distribution system, the claim code may have a use expiration of five minutes. Once used, the claim code may expire upon confirmation of receipt of the secret or after five minutes. In another embodiment, a use attempt policy may state the number of times a claim code may be used to generate a secret. If the number of times has been exceeded, the claim code and/or generated secret may be invalidated. In other embodiments, repeat requests for secrets may be limited to a computer identifier used in a first request using a claim code, such as an IP Address.

While sending and receiving a secret once has been described as having certain advantages, there may be occasions where limiting the number of times a secret may be shared is preferable. For example, a limit of two times may be enforced instead of one time. A claim code may return the same secret twice before switching to a new secret. Having a larger limit may be useful in situations where the secret requires more than trivial computing power to produce.

Figure 4:
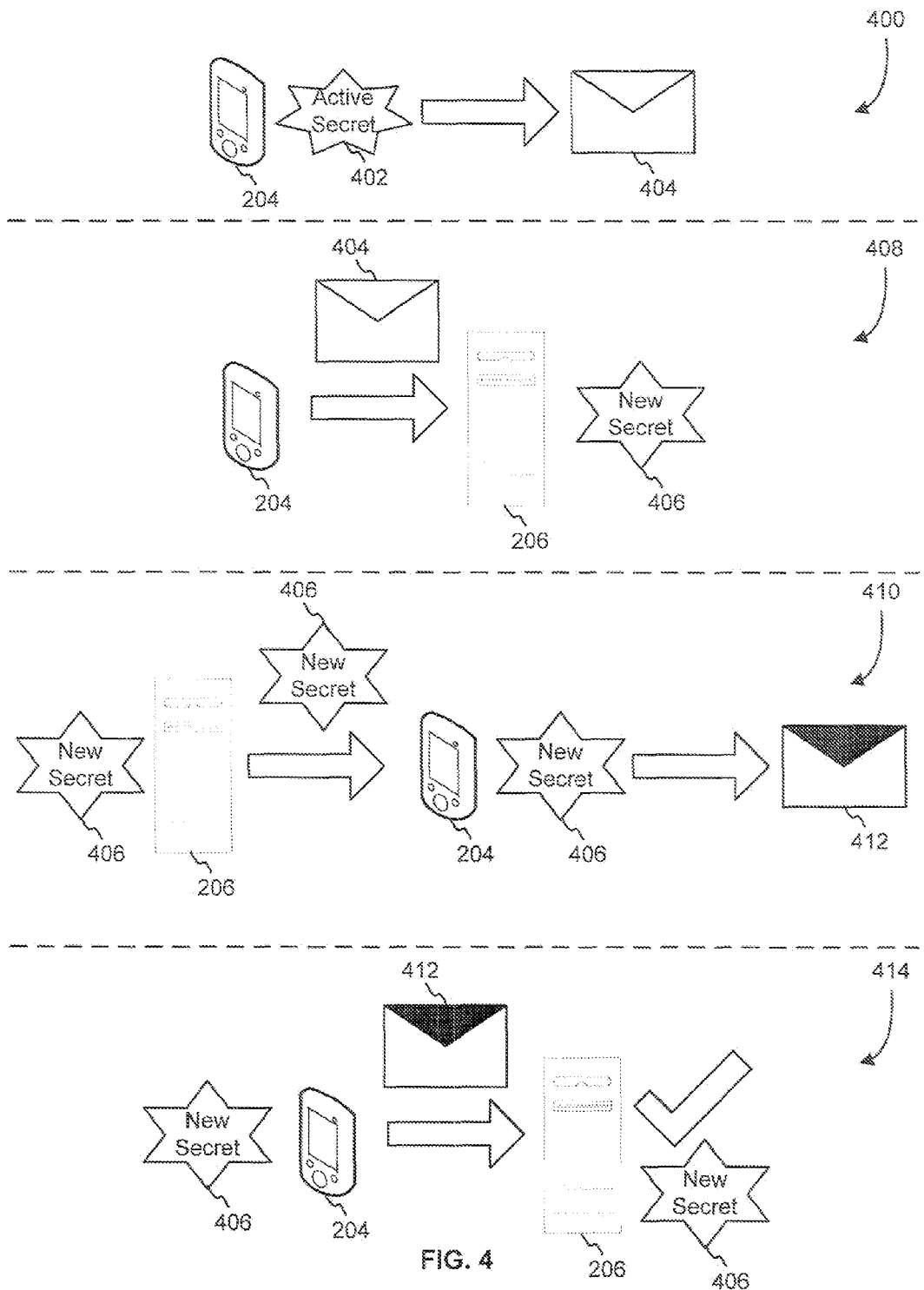
FIG. 4 shows an illustrative example of secret rotation in which a claim code may be used in accordance with at least one embodiment.

Secrets may also be rotated as seen in FIG. 4. In secret rotation process 400, a currently active secret 402 may be used to create a secret replacement message 404 on a mobile device 402. As seen in secret rotation process 408, the secret replacement message 404 may be sent by the mobile device 204 to the secret distribution server 206, which verifies possession of the secret 402 by the secret replacement message 404. The server may then create a new secret 406 and store it. As seen in secret rotation process 410, the new secret 406 may be sent to the mobile device 204, which uses the new secret to create a second message 412 based on the new secret 406. As seen in secret rotation process 414, the mobile device 204 may send the second message 412 to the server 206. The server 206 may verify possession of the new secret 406 by the mobile device 204 through the message 412 which is based on the new secret 406. After verifying the second message 412, the server 206 and mobile device 204 may activate the new secret 412 for use.

Policies may also be used in secret rotation. In some embodiments, the previously active secret 402 may be invalidated after confirmation of receipt of the new secret 406. In other embodiments, it may take time for the new secret 406 to propagate among other client devices, such that two secrets may be allowed to be active for a time. The server 206 may start a countdown, after which the previously active secret 402 will expire. In another embodiment, the client may manually select to expire the previously active secret 402. In one embodiment, the secret replacement message 404 created with the active secret 402 may act as a claim code as described in FIGS. 2 to 3 and be subject to the same policies. In some embodiments, a secret rotation schedule may also be applied. For example, a policy may require that a secret be rotated once a month.

Errors may also occur during secret rotation. If errors occur, they may be treated as described in FIG. 3 with the secret replacement message 404 created with the active secret taking the place of the claim code 202. For example, the secret replacement message 404 may be resent to the server 206 to request a second new secret. If a second new secret is obtained, than a message attempting to confirm the original new secret 406 to the server 206 may fail. Depending on system policies, a mobile device 204 may be permitted to try again if an error is encountered. The mobile device 204 may resend the secret replacement message 404 to the sever 206 to cause a new secret to be created, invalidating the current secret that had failed to become confirmed.

While many of the Figures have shown a mobile device 204, it should be recognized that other devices and computing systems may be used as well. For instance, secret distribution and/or rotation may use server to server communications. In another embodiments, the secret distribution and/or rotation may be include server groups, server clouds, laptops, personal computers, tablet computers or other computing resources as the secret distribution server and/or client.

Figure 5:
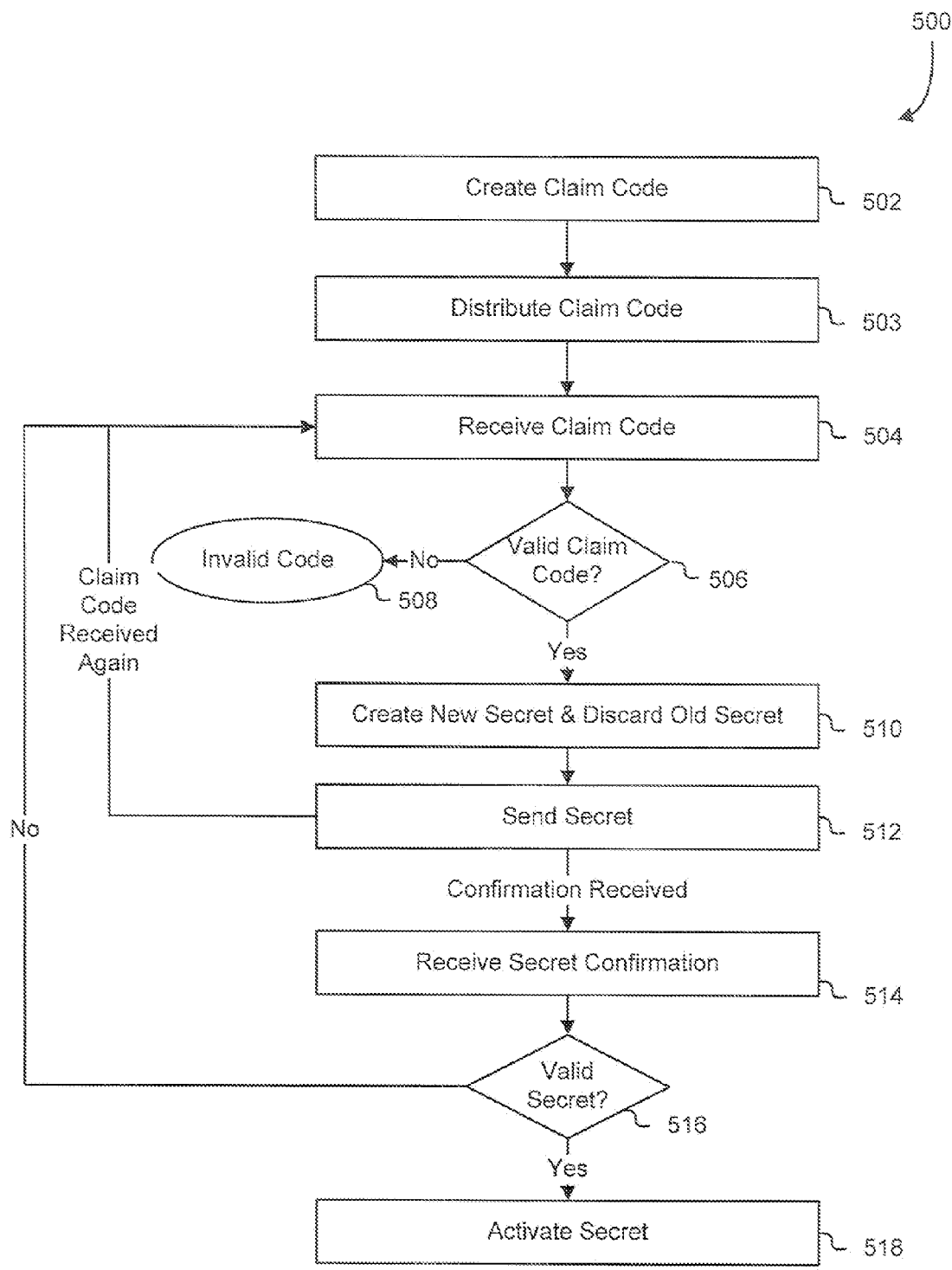
FIG. 5 shows an illustrative example of a process that may be used to distribute a secret in accordance with at least one embodiment.

A process of distributing a secret may be seen in FIG. 5. In one embodiment, the process is performed by a secret distribution system in communication with a laptop. A claim code may be created 502, and if desired, associated with an identity. The claim code may be distributed 503 to the client. The secret distribution system may then receive 504 the code from an external system that received the claim code from the client. If the claim code is not 506 valid, the claim code system may react 508 to the invalid code, such as ignoring the request, sending an error code and/or logging the failed request. If the claim code is valid, the secret distribution system may discard any current secret and create 510 a new secret to associate with the device and/or identity. The secret may then be sent 512 to the device. If the claim code is received 504 again without receiving the confirmation message, the process may return back to process the claim code. However, if the confirmation message is received 514, the confirmation message may be reviewed to see if the message indicates a valid secret 516. If not, the secret distribution system may wait for or request the claim code to be received 504 again. If the confirmation message indicates the secret has been properly received, the secret may be activated 518 for use and the claim code invalidated.

Some or all of the process 500 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some embodiments communications may be secured. In one embodiment, the claim code may be sent in an encrypted manner to the client. For example, the claim code may be displayed on a webpage secured by HTTPS. In another embodiment, the claim code may be received over a secure connection, including a connection protected by SSL/TLS. The secret and/or confirmation message may also be sent over the same or a new secure connection. Depending on the need and security policies, some, none or all of the communication may be secured. Providing a secure communication may reduce the abilities of others to eavesdrop on the transmission of the secret and provide assurance that the secret was only received by one device.

Figure 6:
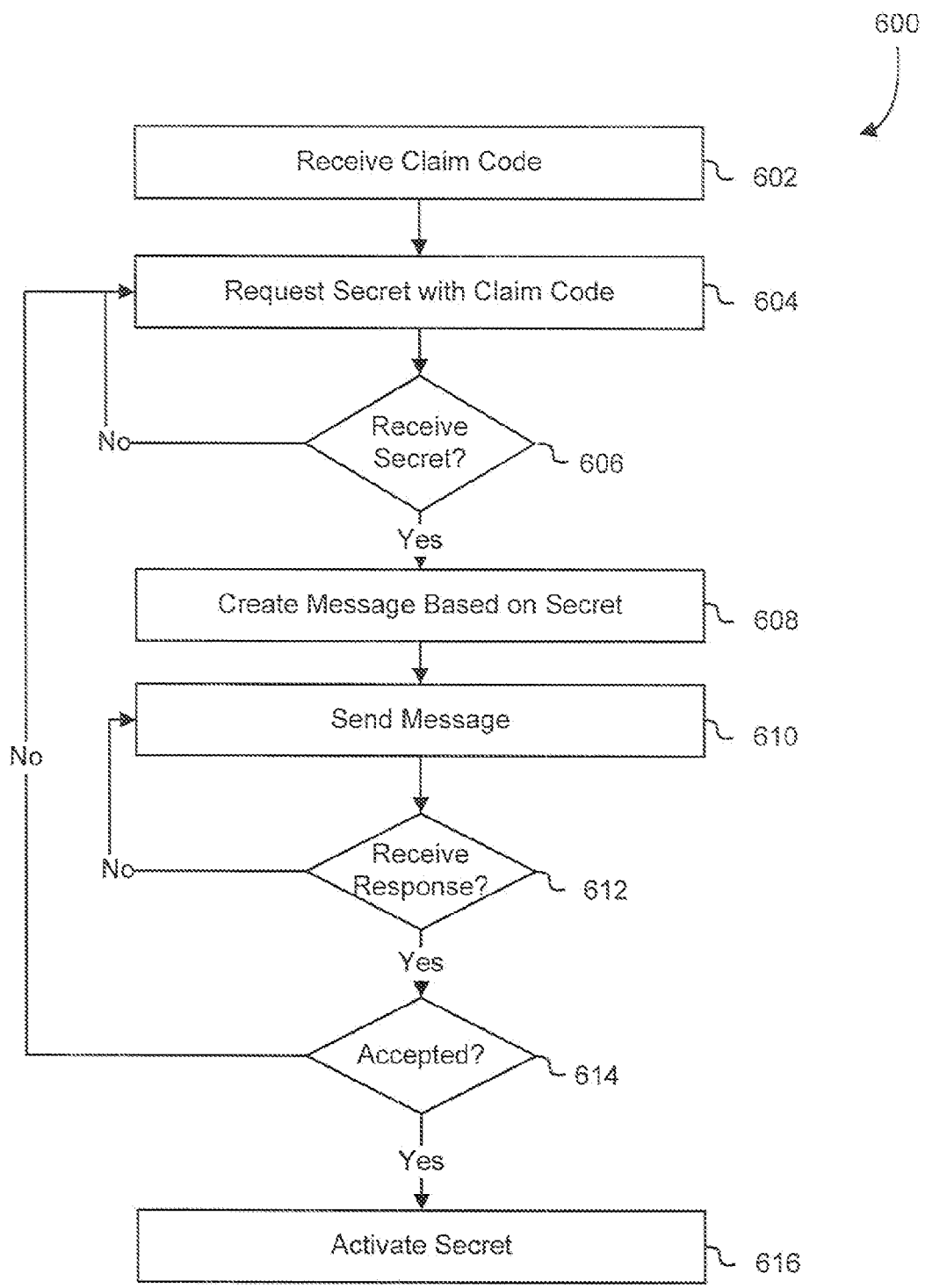
FIG. 6 shows an illustrative example of a process that may be used to rotate a secret in accordance with at least one embodiment.

A process 600 for receiving a secret may be seen in FIG. 6. In one embodiment, the process 600 is performed by a client server system communicating with a secret distribution cloud formed of multiple computing resources. The client system may receive 602 a claim code from a client, including client input or a client request. The claim code may be given to a secret distribution system to request 604 a secret. If a secret is not successfully received 606, the claim code may be sent to request 604 a secret until one is successfully received. Using the secret, a confirmation message may be created 608, such as through a HMAC or encrypting and returning the secret itself. The message may be sent 610 to the secret distribution system to confirm receipt of the secret. Until a response is received 612 from the secret distribution system, the client may continue to send out confirmation messages. If the response does not accept 614 the confirmation message, the client may reset and request a new secret with a claim code 604. If the confirmation message is accepted, the secret 616 may be activated for use. In some embodiments, after the secret is activated for use the claim code will be invalidated.

Figure 7:
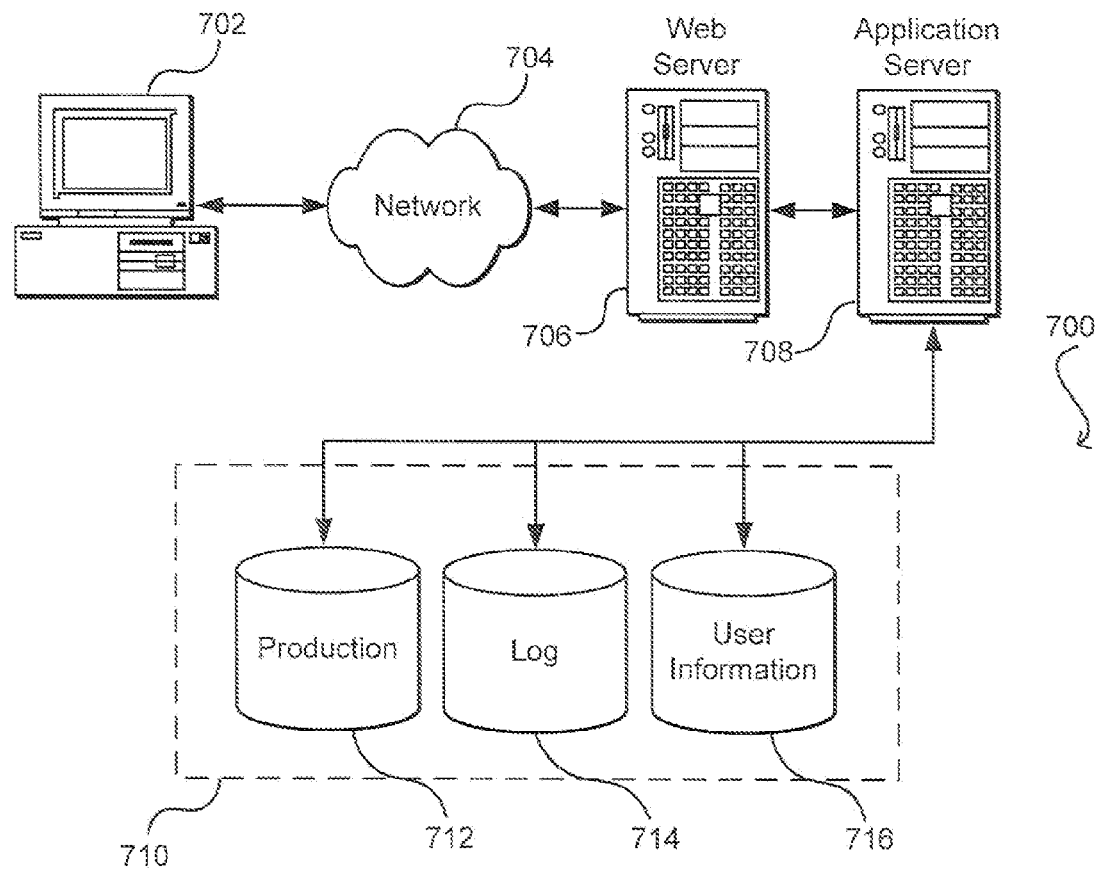
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a client of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control' services in cooperation with the data store, and is able to generate content such as text, graphics, audio, and/or video to be transferred to the client, which may be served to the client by the Web server in the form of HTML, XML, or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases, or other data storage mechanisms and media for storing data relating to a particular aspect. For example, the data store illustrated includes mechanisms for storing production data 712 and client information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. In one example, a client might submit a search request for a certain type of item. In this case, the data store might access the client information to verify the identity of the client, and can access the catalog detail information to obtain information about items of that type. The information then can be returned to the client, such as in a results listing on a Web page that the client is able to view via a browser on the client device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more client computers, computing devices, or processing devices which can be used to operate any of a number of applications. Client or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, suck as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NES, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers. Java servers, and business application servers. The server(s) also may the capable of executing programs or scripts in response requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for sharing a secret, comprising:

under the control of one or more computer systems configured with executable instructions, associating a claim code with an identity of a user of a client device, the claim code comprising a string of characters authorizing the user to receive a pending secret;

causing the claim code to be provided to a user of the client device through a first channel of communication, the claim code associated with a use policy;

receiving the claim code from the client device, the claim code being received through a second channel of communication;

associating the pending secret with the identity of the user based at least in part on the claim code upon determining that the claim code is in compliance with the use policy;

sending the pending secret to the client device through the second channel of communication;

in response to receiving a message based at least in part on the pending secret from the client device, and based at least in part on the use policy, invalidating the claim code and enabling use of the pending secret as proof of the identity of the user, the message including a cryptographic key derived from the pending secret and sent without interaction by the user, sending a response to the client device to indicate that the pending secret has been activated, wherein the client device continues to send the message to the one or more computer systems until it receives the response; and wherein upon receiving a secret replacement message from the client device, sending to the client device one or more additional pending secrets until the claim code is invalidated subject to the use policy, the additional pending secret replacing the pending secret when the client device is sent the one or more additional pending secrets.

2. The computer-implemented method of claim 1, the method further including:

receiving a request from the client device to access a resource; and authenticating the request by at least two credentials, at least one of the credentials based at least in part on the pending secret.

3. The computer-implemented method of claim 1, wherein sending the pending secret is performed over a secure connection.

4. The computer-implemented method of claim 1, wherein the message based at least in part on the pending secret includes a hash based at least in part on the pending secret.

5. The computer-implemented method of claim 1, wherein the claim code has an expiration length, the claim code expiration length being based at least in part on the time the claim code was issued to the client.

6. The computer-implemented method of claim 1, wherein the claim code has an expiration length, the claim code expiration length being based at least in part on the time the claim code was received from the client device.

7. The computer-implemented method of claim 1, wherein the claim code comprises a clear text code suited to manual entry by the user of the client device.

8. The computer-implemented method of claim 1, wherein the pending secret comprises an encrypted message sent to the client device.

9. A computer-implemented method for sharing a secret, comprising:

under the control of one or more computer systems configured with executable instructions,
providing, via a first communication channel, a claim code associated with a use policy, the claim code comprising a string of characters authorizing the user to receive a pending secret;
receiving, via a second communication channel different from the first communication channel, a secret creation message from a client device, the secret creation message associated with an identity of a user of a client device, the secret creation message including the claim code;
associating a pending secret with the identity of the user in response to receiving the secret creation message from the client device upon determining that the secret creation message is in compliance with the use policy;
sending the pending secret to the client device;
receiving, from the client device, a confirmation message including a cryptographic key derived from the pending secret sent to the client device, the confirmation message including a confirmation of receipt of the pending secret by the client device and being received without user interaction;
resending the pending secret to the client device until the confirmation is received from the client device;
providing, upon receiving a secret replacement message from the client device, one or more additional pending secrets to the client device to replace the pending secret; and
activating the pending secret and invalidating the claim code.

10. The computer-implemented method of claim 9, wherein the secret creation message has an expiration length, the secret creation message expiration length being based at least in part on the time the secret creation message was received from the client.

11. The computer-implemented method of claim 9, wherein the secret creation message has an expiration length, the secret creation message expiration length being based at least in part on the time the pending secret was activated.

12. The computer-implemented method of claim 9, wherein the secret creation message is a claim code.

13. The computer-implemented method of claim 9, wherein receiving a confirmation message further includes:
in response to receiving a message including the secret creation message but not the pending secret from the client device, associating a new pending secret with the identity of the user and sending the new pending secret to the client device,
wherein the client device is able to receive one or more pending secrets until receipt of the pending secret by the client device is confirmed.

14. The computer-implemented method of claim 9, wherein the activated secret represents a credential, the credential used in granting access to resources.

15. The computer-implemented method of claim 9, wherein the secret creation message is a secret replacement message.

16. The computer-implemented method of claim 15, the method further includes having a secret to be replaced and the pending secret activated concurrently.

17. A computer system for sharing a secret, comprising:
one or more processors; and
memory, including instructions executable by the one or more processors to cause the computer system to at least:
receive, via a first communication channel, an indication of a claim code comprising a string of characters authorizing receipt of a pending secret;
send, via a second communication channel, a secret creation message to a secret management system, the secret creation message forming at least part of a message to request the pending secret from the secret management system and including the claim code;
receive the pending secret from the secret management system, based at least in part on the secret creation message;
generate a cryptographic key from the received the pending secret;
send, independent of user interaction, a confirmation message including the generated cryptographic key to the secret management system, the confirmation message including a confirmation of receipt of the pending secret by the client device;
receive an acceptance of the confirmation message from the secret management system, wherein the instructions further cause the computer system to continue to send the confirmation message to the secret management system until the acceptance of the confirmation message is received;
upon determining that the pending secret is invalid, send a secret replacement request to the secret management system; and
upon determining that the pending secret is valid, activate the pending secret and invalidating the claim code.

18. The computer system of claim 17, wherein the memory includes further instructions that cause the computer system to at least use the pending secret to obtain access to a resource.

19. The computer system of claim 17, wherein receiving the pending secret further includes:
in response to encountering an error in performing one or more of the operations, sending a secret creation message one or more additional times to the secret management system; and
wherein the secret management system is able to receive the secret creation message one or more additional times and send an additional new pending secret in response to each time the secret creation message is received until accepting a confirmation message based on a last-sent additional new pending secret.

20. The computer system of claim 17, wherein the memory includes further instructions that cause the computer system to at least:
receive a temporary message from the user, the secret creation message based in part on the temporary message; and
wherein the pending secret is received by the computer system without the pending secret being disclosed to the user.

21. One or more non-transitory computer-readable storage media having collectively stored thereon executable instructions that, when executed by one or more processors of a computer system, cause the computer system to at least:
provide, via a first communication channel, a claim code associated with a use policy, the claim code comprising a string of characters authorizing the user to receive a pending secret;

receive, via a second communication channel, a secret creation message from a client device, the secret creation message associated with an identity of a user of a client device and including the claim code;

associate a pending secret with the identity of the user in response to receiving the secret creation message from the client device upon determining that the secret creation message is in compliance with the use policy;

send the pending secret to the client device;

receive a confirmation message based at least in part on the pending secret sent to the client device, the confirmation message including a confirmation of receipt of the pending secret by the client device and a cryptographic key derived from the pending secret, the confirmation message received from the client device independent of user interaction, wherein the instructions further cause the computer system to continue to send the pending secret to the client device until the confirmation message is received;

send, upon receiving a secret replacement message from the client device, to the client device one or more additional pending secrets until the confirmation message is received, the additional pending secret replacing the pending secret when the client device is sent the one or more additional pending secrets; and enable the pending secret as evidence of the identity of the user and invalidating the claim code.

22. The storage media of claim 21, wherein the instructions, when executed by the one or more processors of the computer system, cause the computer system to at least:

send the secret creation message to the client device, the secret creation message being disclosed to the user of the client device; and wherein the pending secret is sent by the computer system to the client device without being disclosed to the user, the pending secret based in part on the secret creation message.

23. The storage media of claim 21, wherein receiving a confirmation message includes:

receiving a confirmation message based at least in part on a secret other than the pending secret;

invalidating the pending secret; and sending an error message to the client device.

24. The storage media of claim 21, wherein the pending secret forms at least part of a credential, the credential granting authorization to use a resource.

* * * * *